United States Patent
Mack

(10) Patent No.: US 10,492,384 B1
(45) Date of Patent: Dec. 3, 2019

(54) FIELD IRRIGATION SYSTEM

(71) Applicant: Roger A. Mack, Melstone, MT (US)

(72) Inventor: Roger A. Mack, Melstone, MT (US)

(73) Assignee: Roger A. Mack, Melstone, MT (US)

( * ) Notice: Subject to any disclaimer, the term of this patent is extended or adjusted under 35 U.S.C. 154(b) by 0 days.

(21) Appl. No.: 15/496,390

(22) Filed: Apr. 25, 2017

(51) Int. Cl.
*A01G 25/09* (2006.01)
*A01G 25/16* (2006.01)
*A01G 22/00* (2018.01)

(52) U.S. Cl.
CPC ........... *A01G 25/092* (2013.01); *A01G 22/00* (2018.02); *A01G 25/09* (2013.01); *A01G 25/16* (2013.01)

(58) Field of Classification Search
CPC ...... A01G 25/092; A01G 22/00; A01G 25/09; A01G 25/16
USPC .......................................................... 239/1
See application file for complete search history.

(56) References Cited

U.S. PATENT DOCUMENTS

| | | | | |
|---|---|---|---|---|
| 1,966,783 A * | 7/1934 | Balaam | ................. | A01G 25/09 239/578 |
| 2,714,826 A * | 8/1955 | Jasper | .................... | B62D 11/08 180/6.66 |
| 4,365,748 A * | 12/1982 | Emrich | ..................... | B05B 9/06 239/728 |
| 4,763,836 A * | 8/1988 | Lyle | ....................... | A01G 25/09 239/243 |
| 4,909,334 A | 3/1990 | Tanner et al. | | |
| 5,078,326 A * | 1/1992 | Wright | ................. | A01G 25/092 239/735 |
| 5,435,495 A | 7/1995 | Davis | | |
| 5,505,386 A | 4/1996 | Stone | | |
| 6,116,527 A | 9/2000 | Granger et al. | | |
| 6,131,833 A * | 10/2000 | Chapman | ............. | A01G 25/092 239/728 |
| 6,616,374 B2 * | 9/2003 | Starr | .................... | A01G 25/092 239/728 |
| 7,094,443 B2 | 8/2006 | Loucks | | |
| 7,946,658 B2 | 5/2011 | Lanser | | |
| 8,490,899 B2 * | 7/2013 | Korus | .................... | B62D 55/08 239/722 |
| 8,550,383 B2 | 10/2013 | McConnell | | |
| 2002/0125350 A1 * | 9/2002 | Buller | .................... | A01G 25/09 239/726 |

FOREIGN PATENT DOCUMENTS

RU          1551287 A1      3/1990

* cited by examiner

*Primary Examiner* — Chee-Chong Lee
(74) *Attorney, Agent, or Firm* — Lerner, David, Littenberg, Krumholz & Mentlik, LLP

(57) ABSTRACT

A tower for a mobile-tower agricultural irrigation system such as a pivot irrigation system using multiple towers to carry a water supply pipe and sprinklers over a field. The tower includes a fender overlying the wheels or other ground-engaging elements of the tower. The fender may project in widthwise directions transverse to the track travelled by the tower, and serves to deflect water discharged from the sprinklers away from the track travelled by the tower, so as to minimize formation of ruts in the track. The fender desirably is disposed at a height above the field such that the fender can pass over a crop growing in the field. The sprinklers disposed closest to the tower having the fender may be disposed at a height well above the fender, whereas other sprinklers further from the tower may be disposed at lower heights.

13 Claims, 3 Drawing Sheets

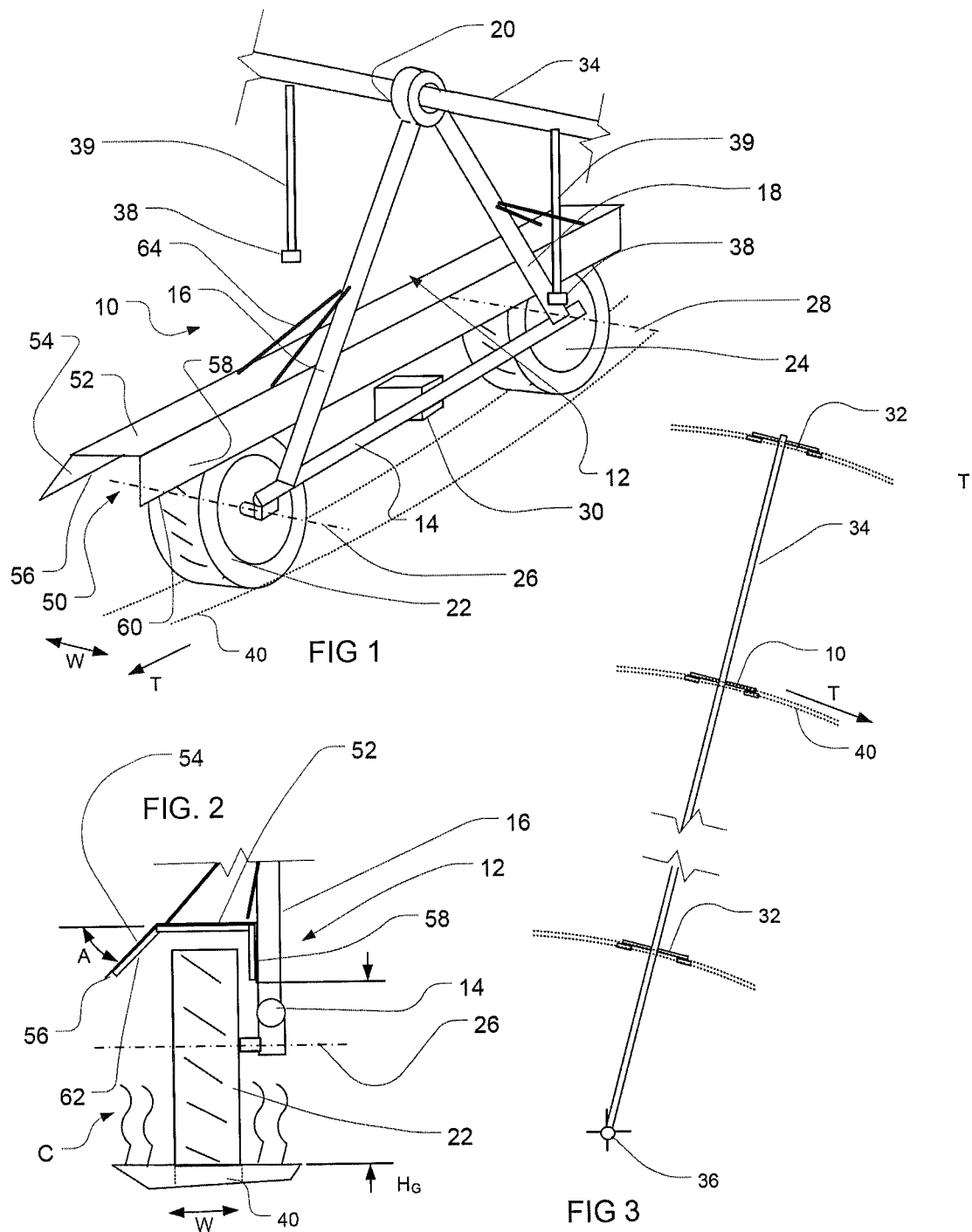

US 10,492,384 B1

FIELD IRRIGATION SYSTEM

BACKGROUND OF THE INVENTION

The present invention relates to mobile irrigation systems for agricultural fields. More particularly, the present invention relates to irrigation systems using a plurality of movable towers and a water supply pipe extending between the towers.

A common type of movable-tower irrigation system is referred to as a pivot irrigation system. A typical pivot irrigation system includes a plurality of towers. Each tower includes a frame with wheels mounted at the bottom of the frame and a motor arranged to drive at least one of the wheels. A water supply pipe extends from a fixed center pivot across the tops of the towers. Numerous sprinkler pipes are connected to the water supply pipe. In operation, the motors of the towers are actuated to drive the wheels so as to move the towers in a. As the towers move, the supply pipe swings around the center pivot 18. This motion is accommodated by a rotary coupling at the center pivot, which allows the supply pipe to swing in an arc or circle around the center pivot. Thus, each tower moves along an arcuate path such as a circle or part of a circle around the center pivot.

Systems of this type are widely used in large-scale agricultural irrigation. Such a system may include numerous towers and the water supply pipe may extend over a length of hundreds of feet. A large system of this type can irrigate a field of tens or hundreds of acres. Because the water supply pipe is carried at the tops of the towers, it passes over the crop growing in the field without damaging the crop. However, the crop typically does not grow in the tracks formed by the wheels of the towers, because the wheels will crush the growing plants.

Each tower is designed to have a relatively small width in directions transverse to the direction in which the tower moves. For example, the tower may include only two wheels arranged in a single row so that both wheels travel in the same track. The narrow structure allows the tower minimizes damage to the crop growing along the sides of the track, and allows the tower to move along the track without being blocked by the crop.

As the system operates, the wheels repeatedly traverse over the ground in the tracks while the ground is being moistened by the water applied to irrigate the crop. The wheels can form ruts in the ground at the tracks. As the ruts deepen, the wheels of one or more towers may become stuck in the ruts. When this occurs, the tower, the supply pipe or other elements of the pivot irrigation tower may be damaged. Also, when a tower is stuck, the farmer must travel out into the field and pull the tower from the rut using equipment such as a tractor or truck. This results in damage to the crop in the field and a considerable waste of time and labor. Moreover, the ruts can cause damage to other farm equipment that travels across the field. Considerable effort has been devoted in the art to solving this problem. However, no truly satisfactory tower has been found heretofore.

BRIEF SUMMARY OF THE INVENTION

One aspect of the invention provides an improved tower for a multi-tower agricultural irrigation system. A tower according to this aspect of the invention desirably includes a frame adapted to support a water supply pipe. The tower desirably includes one or more one ground-engaging elements such as wheels that are movably mounted to the frame and adapted to rest on the surface of a field. The ground-engaging elements are arranged to allow movement of the frame in a travel direction with the ground-engaging elements contacting the surface of the field in a track along the surface. The tower according to this aspect of the invention most preferably includes a water-impervious fender mounted to the frame and extending over the ground-engaging elements. The fender has opposite edges spaced apart from one another in a widthwise direction transverse to the travel direction, the fender having a width between the edges greater that a width of the ground-engaging elements. Desirably, both of the edges of the fender extend beyond the ground-engaging elements. The edges of the fender, and desirably the entire fender, preferably are disposed at a substantial height above the field surface. For example, the fender may be disposed entirely above a vertical mid-point of the ground-engaging elements as, for example, well above the axes of the wheels. As further discussed below, such a fender can effectively shield the track form the water discharged from the sprinklers, and thus materially reduce or eliminate formation of ruts in the tracks.

Further aspects of the invention provide fenders for use in such towers and irrigation systems incorporating such towers. Still other aspects of the invention provide methods of irrigation using such fenders to shield the tracks.

BRIEF DESCRIPTION OF THE DRAWINGS

FIG. 1 is a diagrammatic perspective view of a tower according to one embodiment of the invention.

FIG. 2 is a fragmentary front elevational view of the tower shown in FIG. 1.

FIG. 3 is a fragmentary, diagrammatic top plan view of an irrigation system incorporating the tower of FIGS. 1 and 2.

DETAILED DESCRIPTION

Figure 4:
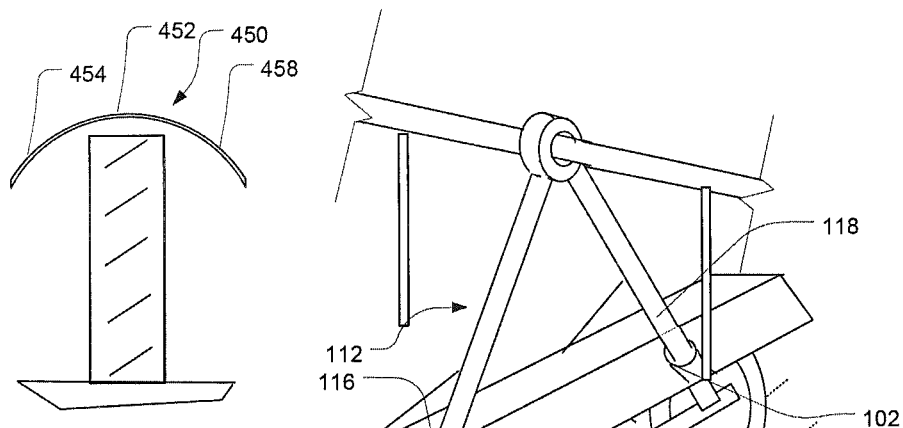
FIGS. 4 and 5 are views similar to FIGS. 1 and 2 respectively, but depicting a tower according to another embodiment of the invention.

A tower 10 according to one embodiment of the invention (FIG. 1) includes a generally triangular frame 12 having a horizontal bottom member 14. The frame also includes a front member 16 and a rear member 18 extending upwardly from the bottom member and joining one another at a pipe clamp 20 at the top of the frame. A front wheel 22 and a rear wheel 24 are rotatably mounted to the frame at the bottom of the frame. The wheels are disposed on one side of the frame, with the axes 26 and 28 of the wheels extending transverse to the plane of the triangular frame. Wheels 22 and 24 may be several feet in diameter, and may include tires similar to the tires used as drive wheels on agricultural tractors. A motor 30 such as an electric motor is mounted to the frame as, for example, to the bottom member 14. The motor is connected by a drive system (not shown) to one or both of the wheels so that the motor can drive the wheels. The foregoing features of the tower may be entirely conventional.

The tower 10 can be used in conjunction with other mobile towers 32 (FIG. 3) in a pivot irrigation system. Each of the other towers 32 may be of similar construction to tower 10. A water supply pipe 34 extends from a center pivot 36 across the towers 10 and 32. As seen in FIG. 1, the water supply pipe 34 is engaged in pipe clamp 20, so that tower 10 is in a fixed position along pipe 34, at a fixed radius from the center pivot. Additional bracing (not shown) may be provided in the conventional manner to stabilize the mechanical connection between the frames of the towers and the supply pipe, and to reinforce the supply pipe against bending. Numerous sprinklers 38 are connected to the supply pipe 34 along its length. In this embodiment, the sprinklers 38 are mounted to the supply pipe 34 by hoses 39 extending downwardly from the supply pipe. Each sprinkler is arranged to discharge water in horizontal directions so that the discharged water falls onto an area of the field surrounding the sprinkler.

When the system operates, each tower moves along a path at a predetermined radius from the center pivot 36 (FIG. 3). Thus, the wheels of tower 10 travel along a path or track 40 in a travel direction T corresponding to the forward direction of the tower. A small portion of track 40 is depicted in FIG. 1.

The tower according to this embodiment of the present invention includes a fender 50 (FIGS. 1, 2). Fender 50 is generally in the form of a channel of constant cross-section formed from a water-impervious material such as a sheet of steel bent to form the channels. The channel extends forwardly and rearwardly along the tower. The fender includes a central portion 52 overlying the wheels 22 and 24. In this embodiment, the central portion 52 is flat and lies in a horizontal plane slightly above the tops of the wheels as, for example, about 6 inches above the tops of the wheels. The fender further includes a first side portion 54 sloping downwardly from the center portion to a first edge 56 of the fender. The first side portion desirably slopes at an angle A (FIG. 2) of less than 75 degrees, and more preferably about 45 to 60 degrees to a horizontal plane. The fender has a second side portion 58 disposed on the opposite side of the central portion from first side portion 54. The second side portion 58 extends downwardly from center portion 58 to a second edge 60 of the fender. In this embodiment, the second side portion is vertical, and thus perpendicular to the central portion 52.

The fender in this embodiment includes reinforcing elements 62, some of which are seen in FIG. 2, such as angle irons mounted within the fender. The fender is mounted to the frame 12 by mechanical fasteners such as cables 64 (FIG. 1) extending between the fender and the front and rear elements 16 and 18 of the frame. These cables may be equipped with turnbuckles (not shown) for tensioning the cables. The fender can be mounted to the frame without modifying the frame or disassembling other elements of the tower. The fender is mounted with the first side portion 54 remote from the frame and the second side portion 58 disposed between the wheels and the frame.

The fender is wider than the wheels. As referred to in this disclosure, the "width" of a component is its dimension in widthwise directions W perpendicular to the travel direction T of the tower. For example, in one embodiment, the central portion is 24 inches wide, whereas each side portion 54 and 58 extends 12 inches from the central portion. The first side portion is disposed at an angle A of 45 degrees to the horizontal, and thus extends about 8.5 inches in the widthwise direction from the central portion, so that the total width of the fender is about 20.5 inches. In this embodiment, the tire on each wheel is about 12 inches wide.

Figure 9:
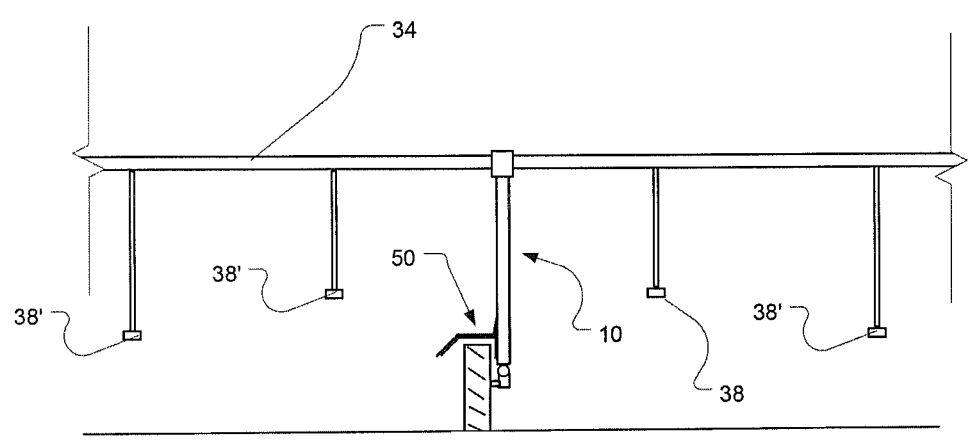
FIG. 9 is a fragmentary elevational view of the system shown in FIGS. 1-3.

The fender completely covers the wheels and the track 40 contacted by the wheels, and projects in the widthwise directions beyond the wheels and track. The fender also covers the motor 30 and associated components of the drivetrain. As shown in FIG. 9, the sprinklers include first sprinklers 38 closest to the tower 10 and fender 50. These first sprinklers desirably are arranged to discharge water at a height well above the fender 50 as, for example, at least a foot and desirably two feet or more above the fender. The sprinklers also include additional sprinklers 38' remote from the tower. These additional sprinkler 38' may be mounted a height lower than the height of the first sprinklers 38 to minimize evaporation of the applied water as it passes downwardly onto the field.

During use, the fender intercepts water discharged from the sprinklers and directs the intercepted water away from the wheels and track. This substantially reduces the formation of ruts in the track. The fender also protects the motor and drivetrain from the spray. It is not essential that the fender completely prevent water from falling on the track. Mounting the sprinklers closest to the tower well above the fender significantly increases the effectiveness of the fender in protecting the track from the water. Although the present invention is not limited by any theory of operation, it is believed that this arrangement helps to assure that the water discharged from the sprinklers is falling nearly vertically or by the time it reaches the fender. This arrangement is especially effective under low wind conditions.

Figure 5:
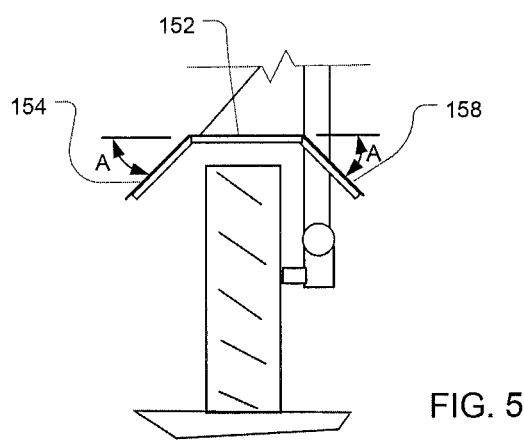

The fender is disposed high above the ground. The edges 56 and 60 are disposed far above the axes 26 and 80 of the wheels, and thus above the vertical mid-point of the wheels. In this embodiment, the side portions and edges of the fender extend only slightly below the tops of the wheels, as, for example only about 6 inches or less below the tops of the wheels. For example, the entire fender 50, including edges 56 and 58 may be about 36 inches or more above the ground, and desirably 48 inches or more above the ground. This allows the edges to pass above the crop C (FIG. 2) growing near the edges of track 40, and assures that the edges do not become entangled in the crop A tower according to a further embodiment (FIGS. 4 and 5) is identical to the tower of FIGS. 1 and 2, except that the fender 150 of FIGS. 4 and 5 has a second side portion 158 that is oblique to the horizontal plane of the center portion 152. Both the second side portion 158 and the first side portion 154 desirably slope at angles a less than about 75 degrees, and preferably about 45 degrees. In this embodiment, the second side portion 158 projects beyond frame 112. The second side portion may be provided with openings such as holes or slots 102 to accommodate elements of the frame, such as elements 116 and 118. These openings may be left uncovered or closed by separate patches (not shown).

Figure 6:
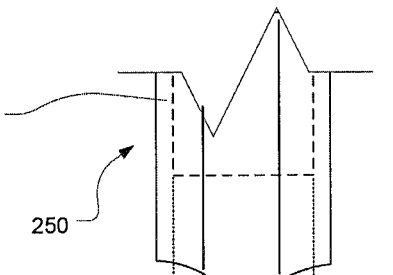
FIGS. 6 and 7 are fragmentary top plan views depicting fenders used in still further embodiments of the invention.
Figure 7:
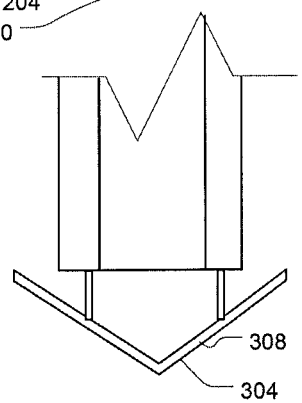

As discussed above, the fender typically passes above the crop. However, where the crop includes very tall plants, such as late-season corn plants, the projecting edges of the fender can come into engagement with the plants. To minimize damage to the crop, the fender may be shaped as shown in FIG. 6. The fender 250 has a front edge 204 with a leading portion 206 near the center of the fender in the widthwise direction and aligned with the wheels 222 of the tower, so that the leading portion will be aligned with the wheels 222 and the track 240 traversed by the wheels. The front edge 204 slopes rearwardly, in the direction opposite to the travel direction, in the widthwise directions away from the leading portion 206. The front edge will tend to deflect any plants that are engaged with the fender in the widthwise directions so that the plants bend slightly to clear the fender, rather than becoming entangled inside the fender. In FIG. 6, the front edge of the fender is defined by the channel itself. However, as shown in FIG. 7, the front edge 304 may be defined by a bumper 308 separate from the channel that forms the main portion of the fender. In a further variant, the channel or the bumper may define a closed front-end surface having a shape similar to the front edge.

Figure 8:
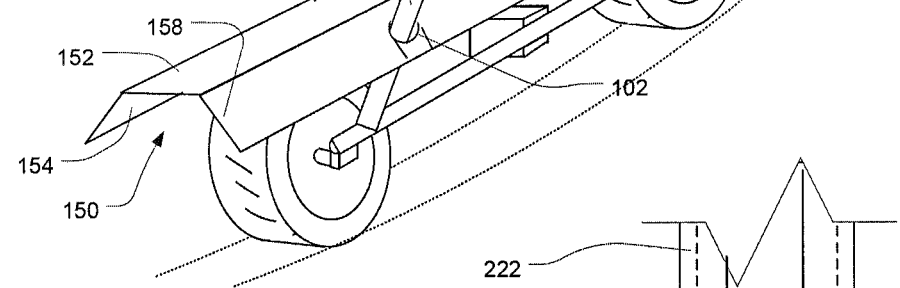
FIG. 8 is a fragmentary front elevational view of a tower according to yet another embodiment of the invention.

The cross-sectional shape of the fender may be varied. For example, as shown in FIG. 8, the fender 450 has a curved cross-sectional shape such as a sector of a cylinder. In this embodiment, the central portion merges smoothly with the sloping side portions 454 and 458. In still further embodiments, the fender may have other shapes. Also, the fender need not have a uniform cross-sectional shape along its entire length.

The fender may be formed from any water-impervious material as, for example, sheet metal, molded polymers, and the like. It is desirable to keep the weight of the fender to as low as possible to further minimize rut formation. For example, the fender and the elements that attach the fender to the tower frame, desirably add about 250 pounds or less to the weight of the tower.

In the embodiments discussed above, the wheels serve as the ground-engaging elements of the tower that support the tower and carry it across the ground. However, some towers use other elements such as endless belts or crawler treads to perform these functions. Fenders as discussed above can be used with any type of ground-engaging elements. Also, the particular frame illustrated herein is merely one example. The frame may have other configurations.

As discussed above in connection with FIG. 3, the present invention can be applied in pivot irrigation systems. However, the invention is not limited to use with pivot irrigation systems; it can be applied to other mobile-tower irrigation systems where a set of towers supporting a supply pipe and sprinklers move along linear, rather than arcuate paths.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An agricultural field irrigation system comprising:
   (a) a first tower including
      (i) a frame;
      (ii) one or more ground-engaging elements movably mounted to the frame and adapted to rest on the surface of a field, the one or more ground-engaging elements being arranged to allow movement of the frame in a travel direction with the ground-engaging elements contacting the surface in a track along the surface; and
      (iii) a water-impervious fender mounted to the frame and extending over the ground-engaging elements, the fender having first and second side portions spaced apart from one another in a widthwise direction transverse to the travel direction, the side portions of the fender defining opposite edges of the fender spaced apart from one another in the widthwise direction, the fender having a width between the edges greater that a width of the one or more ground-engaging elements so that the side portions of the fender and both of the edges of the fender project in the widthwise direction beyond the ground-engaging elements, the entirety of the side portions of the fender being disposed above the vertical mid-point of the ground-engaging elements so as to minimize damage to a crop growing on the field on opposite sides of the track;
   (b) one or more additional mobile towers, a supply pipe extending between the first tower and the one or more additional towers and supported by the first tower and the one or more additional mobile towers;
   (c) a plurality of sprinklers communicating with the supply pipe and arranged to discharge water, the plurality of sprinklers including a first sprinkler closest to the first tower and the fender and arranged to discharge water at a first height above a height of the fender, the plurality of sprinklers also including one or more additional sprinklers remote from the first tower and arranged to discharge water at a second height lower than the first height wherein the plurality of sprinklers are disposed between the first tower and a next one of the one or more additional mobile towers the disposition of the first sprinkler at the first height and the projecting side portions of the fender cooperatively protecting the track from intrusion of water into the track.

2. The system of claim 1 wherein the entirety of the fender is disposed above the vertical mid-point of the ground-engaging elements.

3. The system of claim 1 wherein the one or more ground-engaging elements of the first tower include a pair of wheels mounted for rotation about axes spaced apart from one another in the travel direction and the edges of the fender are disposed above the axes of the wheels.

4. The system of claim 3 wherein the edges of the fender are disposed at least 24 inches above the bottom of the wheels.

5. The system of claim 4 wherein at least one edge of the fender projects beyond the wheels in a widthwise direction by at least about 8 inches.

6. The system of claim 3 wherein the fender has a central portion overlying the wheels and the edges of the fender are lower than the central portion.

7. The system of claim 6 wherein the first side portion slopes downwardly from the central portion to a first one of the edges at an angle of less than 75 degrees to a horizontal plane.

8. The system of claim 7 wherein the first side portion slopes downwardly at an angle of about 45 degrees to a horizontal plane.

9. The system of claim 8 wherein the wheels are offset from the frame in a first widthwise direction and the first side portion is disposed remote from the frame so that the wheels are disposed between the first side portion and the frame.

10. The system of claim 9 wherein the second side portion extends downwardly from the central portion to a second one of the edges.

11. The system of claim 10 wherein the second side portion extends between the wheels and the first tower.

12. The system of claim 1 wherein the fender includes an elongated channel extending in the travel direction.

13. The system as claimed in claim 1 further comprising a center pivot, the supply pipe extending radially from the center pivot.

* * * * *